Feb. 6, 1940.　　　G. F. CHARD　　　2,189,134
HYDRAULIC BRAKE
Filed Dec. 28, 1935
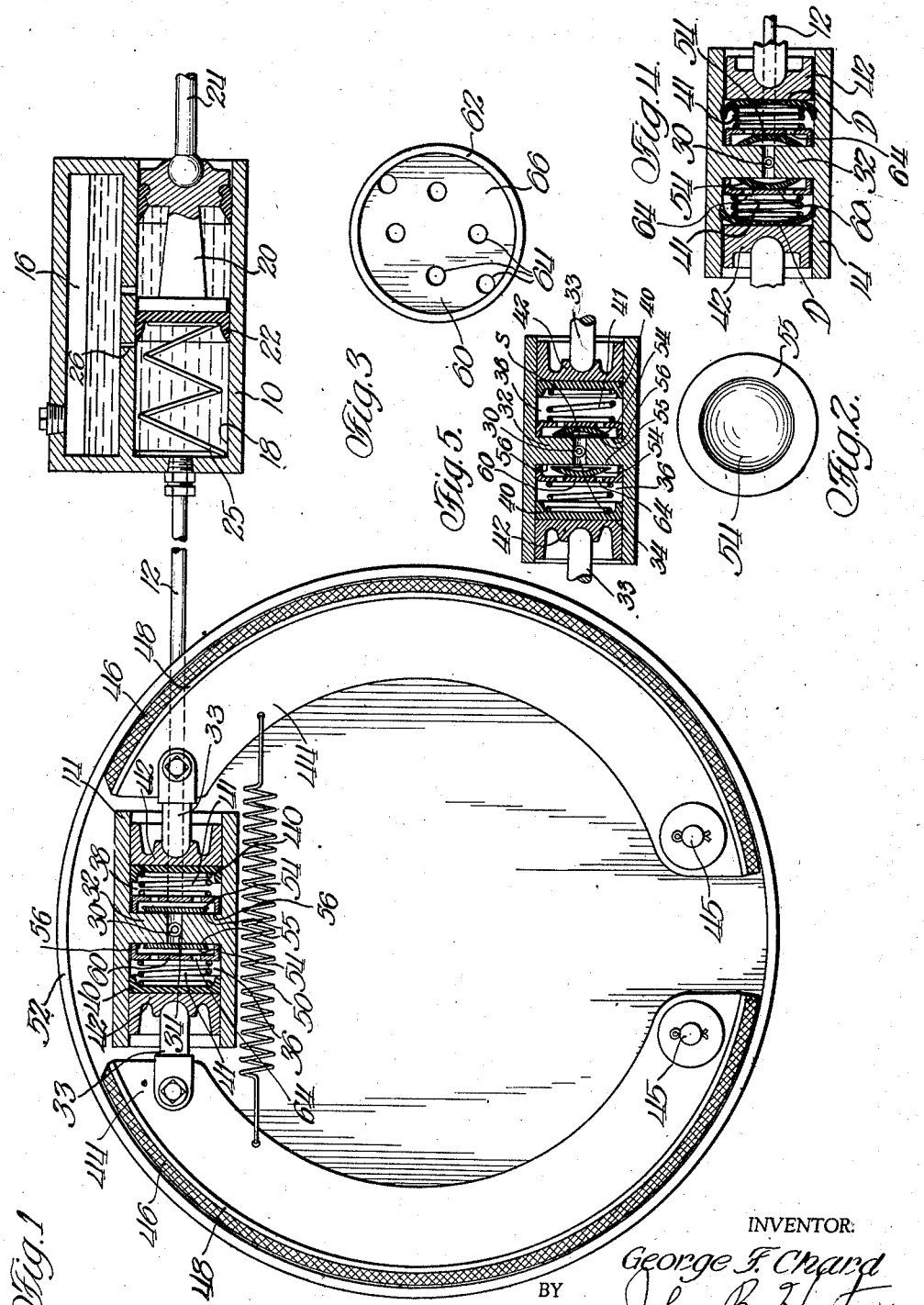
INVENTOR:
George F. Chard
BY John B. Hosty
ATTORNEY.

Patented Feb. 6, 1940

2,189,134

UNITED STATES PATENT OFFICE 2,189,134

HYDRAULIC BRAKE

George F. Chard, Elmwood Park, Ill., assignor of one-half to Joseph M. Sachs, Chicago, Ill.

Application December 28, 1935, Serial No. 56,414

14 Claims. (Cl. 188—152)

My invention relates to improvements in brakes.

My invention relates more particularly to hydraulic brakes.

As is well known to those familiar with brakes for automotive vehicles, it is frequently necessary to adjust the brakes. The brake bands wear under normal use and as a result a lesser braking effect is exerted by an identical manual application. The usual method of correcting this is by shortening the effective brake rod length or increasing the leverage to actuate the brake shoes and bands. This is true of either mechanical or hydraulic brakes.

The principal object of my invention is to provide an improved hydraulic brake construction wherein the action of the same operates automatically to compensate for the wear on the brake bands and thereby makes each brake self-adjusting.

A further object of the invention is to provide an improved hydraulic brake having an automatic adjusting means for the brake shoes.

A further object is to provide an improved compensating valve member for this purpose.

A further object is to provide an improved hydraulic brake structure having a pair of compensating valve members capable of independent operation to automatically adjust the position of each brake shoe with respect to the drum.

A further object is to provide an improved self-adjusting hydraulic brake easily and cheaply constructed and capable of long and hard use without becoming broken or out of order.

Other objects and advantages will be more apparent from the following description wherein reference is had to the accompanying sheet of drawings upon which Fig. 1 is a diagrammatic view of a master cylinder, conduit and brake cylinder showing my improved brake cylinder construction, the parts being shown in the release position;

Fig. 2 is a front elevational view of one of the flexible valves used;

Fig. 3 is a similar view of one of the valve cup members;

Fig. 4 is a cross-sectional view of a slightly modified form of cylinder the parts being shown in the expanded or applied position; and Fig. 5 is a longitudinal vertical section of the cylinder 14 showing the parts in the expanded or applied position.

In the embodiment of my invention which I have chosen to illustrate the same, I have shown the conventional type of hydraulic brake system, including the master cylinder 10, which is normally located at a point accessible to the operation of an automotive vehicle and which is adapted to be connected by the fluid conduits 12, with a plurality of brake cylinders 14, one of which is usually located at both of the front and back wheels of the automotive vehicle. The master cylinder 10 may be formed with a chamber 16, which is in the form of an oil reservoir and a cylinder portion 18 within which a piston member 20 is positioned. The piston member 20 may be of the usual type connected by a suitable rod construction 24, with a foot pedal or other manual operating means so that the same can be moved forward when it is desired to apply the brakes of the vehicle. The piston may be formed with a cup-shaped leather or rubber seal member 22 at its forward end that normally engages a compression spring 25 positioned in cylinder 18 to return the piston 20 when pressure is released on the lever 24. A suitable passageway 26 connects the cylinder 18 with the oil reservoir 16.

The conduit 12 may extend from the forward end of cylinder 18 and be connected in a port 30 that enters a medial wall 32 in the brake cylinder 14. An axial bore 34 connects both of the chambers 36 and 38 with the conduit 12. I provide a pair of piston seal members 40 positioned in the chambers 36 and 38 a spaced distance from the medial wall 32 of the cylinder. The piston seal members 40 may be constructed of rubber or other suitable material and are capable of movement inwardly or outwardly within the cylinder. The piston seals are positioned against the pistons 42 by springs 41. The pistons 42 are movably mounted in the chambers 36 and 38. Each of the pistons 42 is connected by the rods 33 to brake shoe 44 of the usual type provided with brake lining 46 upon the faces 48 of the shoes. The usual tension spring 50 connects the shoes 44 to move them from contact with the drum 52 whenever the brakes are released. The brake shoes 44 are pivotally mounted at their lower ends on suitable pin members 45. As thus far described, it is believed that the construction is known to those familiar in the art and that it is generally similar to certain well known hydraulic brakes which are in extensive use.

In order to compensate for the wear on the brake linings 46 and to permit the brake shoes to be removed from contact with the brake drum only a specific distance, I have provided a valve member 54 which is inserted in the chambers 36 and 38. The valve member 54 may be a concave convex flexible disk preferably formed of rubber or other suitable materials and adapted to have its edge portion 55 engage the sides 56 of the medial wall 42. It will be noted that the diameter of valve member 54 is less than the diameter of the chambers 36 and 38 so that the same may be flattened out within limits (Fig. 1). I further provide a pair of cup members 60 which are held in place against the medial wall 32 by spring 41 and adapted to overlie and enclose the flexible valve members 54. The purpose thereof is to limit the action of flexible valve 54. Each of the cup members 60 has a circular edge portion 62 and a plurality of openings 64 formed in the wall 66 thereof.

The operation of my improved valve is as follows:

When the brakes are applied (Figs. 4 and 5) by operation of the lever 24 to actuate the piston 20 of the master cylinder, fluid under pressure is forced outwardly to port 30 and moves the flexible valves 54 away from the sides 56 of the wall 32, flows around said valves 54 through the openings 64 in the cup 60 and presses against the piston seals 40, thus operating to move outwardly the pistons 42 and through the connection with brake shoes 44, apply pressure against the drum 52. After the brakes are released (Fig. 1), the force of spring 50 will be sufficient to move the brake shoes 44 away from the drum 52 a short distance. This action will move the pistons 42 and piston seals 40 into the cylinder, tending to flatten out the flexible valves 54 against the sides of medial wall 32. From the foregoing it can be seen that the valves 54 operate as check valves to prevent the return flow of fluid and thus permit the brake shoes 44 to be withdrawn from the drum 52 no greater than a desired distance, which is determined by the space S between the medial wall 32 and the concave wall of flexible valves 54. It will be apparent that no matter what the thickness of the brake shoe 46 is, the same will be withdrawn only sufficiently to provide the necessary clearance whenever the brakes are released. It is true even though one brake band may be considerably thicker than the other, as each of the valves 54 operates independent of the other and serves only to control the distance that the particular shoe with which it is connected shall move.

In Fig. 4, I have shown a modified form of construction wherein I provide a diaphragm member D constructed of rubber or other suitable material that is held rigidly at its peripheral edge and is capable of movement to flex inwardly or outwardly to move the pistons 42. With this construction the device operates in a manner to that previously described wherein the spring member 42 is positioned against the piston seals 40.

While I have illustrated and described only a specific embodiment, it will be obvious to those skilled in the art that changes and modifications may be made in the particular details shown. It will be apparent that the same construction can easily be applied to external brakes or any other suitable or desired type. It will further be apparent that changes and modifications may be made in the specific details shown and I do not wish to be limited in any particular. Rather, what I desire to secure and protect by Letters Patent of the United States is:

1. A brake cylinder for hydraulic brakes having a medial wall and a cylindrical chamber on each side of said wall, a source of brake fluid connected to said medial wall, a perforated cup member positioned on each side of said wall, a spring retainer therefor, a piston seal, a flexible valve in each cup member adapted to permit fluid to pass to operate said piston seal and a piston operable by said piston seal.

2. A brake cylinder for hydraulic brakes having a medial wall and a cylindrical chamber on each side of said wall, a source of brake fluid connected to said cylinder at said wall, a perforated cup member secured on each side of said wall, a piston seal in each chamber, a flexible valve in each cup member, said flexible valve adapted to permit fluid to pass into said chamber to move said piston seal, and a piston operable by said piston seal.

3. A brake cylinder for hydraulic brakes having a medial dividing wall therein and a cylindrical chamber on both sides of said wall, a passageway through said wall connecting said chambers, a source of brake fluid connected to said cylinders through said passageway, a perforated cup member positioned on each side of said wall, a piston seal in each chamber adjacent the open end thereof, a flexible convex concave-shaped valve positioned in each cup member, said flexible valve adapted to permit fluid to pass into said chamber to move said piston seal outwardly, a piston slidably mounted in said chamber and movable by said piston seal, and a pair of pivoted brake shoe members connected to said pistons.

4. A brake cylinder for hydraulic brakes having a medial dividing wall therein and a cylindrical chamber on both sides of said wall, a passageway through said wall connecting said chambers, a source of brake fluid connected to said cylinders through said passageway, a perforated cup member placed on each side of said wall, a piston seal placed in each chamber adjacent the open end thereof, a flexible convex concave-shaped valve positioned in each cup member overlying said passageway, said flexible valve adapted to permit fluid to pass into said chamber to move said piston seal outwardly and to prevent the return of fluid, a piston slidably mounted in said chamber and movable by said piston seal and a pair of pivoted brake shoe members connected to said pistons, said valve adapted to flatten after a braking operation.

5. A brake cylinder for hydraulic brakes having a medial dividing wall therein and a cylindrical chamber on both sides of said wall, a passageway through said wall connecting said chambers, a source of brake fluid connected to said cylinders through said passageway, a perforated cup member fastened on each side of said wall, a diaphragm rigidly fixed in each chamber adjacent the open end thereof, a flexible convex shaped valve positioned in each cup member overlying said passageway, said flexible valve adapted to permit fluid to pass into said chamber to move said diaphragm outwardly and to prevent the return of fluid, a piston slidably mounted in said chamber and movable by said diaphragm and a pair of pivoted brake shoe members connected to said pistons, said valve adapted to flatten after a braking operation.

6. Hydraulic brake mechanism embodying a chamber, a piston movable in the chamber, a fluid inlet to the chamber, a flexible valve controlling said inlet, said valve adapted to permit fluid to pass into the chamber to move the piston outwardly and to prevent return of the fluid, said valve adapted to be flexed under the action of fluid pressure in the cylinder between the valve and piston to permit the piston to move inwardly a predetermined distance and while the said inlet is closed by said valve.

7. In a hydraulic braking system for automotive vehicles, a brake cylinder, a wall dividing said cylinder into a pair of chambers, a diaphragm rigidly mounted in each chamber adjacent the outer end thereof, a movable piston adjacent each diaphragm, a pair of pivoted brake shoe members associated with said diaphragms and a pair of flexible valve members positioned adjacent said wall and adapted to permit fluid to flow outwardly against said diaphragms and capable of flattening when pressure is released to permit said brake shoes to be moved a determined distance from their advanced position.

8. In a hydraulic braking system for automotive vehicles, a brake cylinder, a wall dividing said cylinder into a pair of chambers, a passageway through said wall, a diaphragm rigidly mounted in each chamber adjacent the outer end thereof, a movable piston adjacent each diaphragm, a pair of pivoted brake shoe members associated with said diaphragms and a pair of flexible valve members positioned on opposite sides of said wall overlying said passageway and adapted to permit fluid to flow outwardly against said diaphragms and capable of flattening when pressure is released to permit said brake shoes to be moved a determined distance from their advanced position.

9. Hydraulic brake mechanism embodying a chamber, a piston at one end of the chamber, and a flexible valve adjacent the other end of the chamber, said valve adapted to permit fluid to flow outwardly against said piston, and capable of flattening when pressure is released to permit said piston to be moved a determined distance from its advanced position, said valve being of a concave-convex disc formation.

10. Hydraulic brake mechanism embodying a chamber, a piston at one end of the chamber, a flexible valve adjacent the other end of the chamber, said valve adapted to permit fluid to flow outwardly against said position, and capable of flattening when pressure is released to permit said piston to be moved a determined distance from its advanced position, said valve being of a concave-convex disc formation, and means for limiting the movement of the valve in the opening direction.

11. Braking mechanism embodying a cylinder having a fluid inlet opening, a piston in the cylinder, a flexible convex concavo shaped element positioned to control said opening and movable under the influence of the fluid to permit an initial supply of fluid to enter the cylinder to move the piston in one direction, means for limiting such movement of said element, and means for moving the piston in the opposite direction, the last said movement of the piston operating to cause the said element to close the said inlet opening to trap the fluid in the cylinder, said element under predetermined conditions yielding under fluid pressure through said opening to admit fluid to the cylinder out of commingling relation with the fluid already in the cylinder, to augment the movement of the piston in the first said direction through the medium of the fluid trapped in the cylinder.

12. Braking mechanism embodying a cylinder having a fluid inlet opening, a piston in the cylinder, a flexible and floating diaphragm positioned to control said opening and movable under the influence of the fluid to permit an initial supply of fluid to enter the cylinder to move the piston in one direction, means for limiting such movement of said diaphragm, and means for moving the piston in the opposite direction, the last said movement of the piston operating to cause the diaphragm to close the said opening, said diaphragm under predetermined conditions yielding under fluid pressure through said opening to admit fluid to the cylinder, to augment the movement of the piston in the first said direction through the medium of the said fluid which is trapped in the cylinder, the said additional supply of fluid being maintained out of commingling relation with the fluid already in the cylinder.

13. Braking mechanism embodying a cylinder having a fluid inlet opening, a piston in the cylinder, a flexible and floating diaphragm for controlling said opening and disposed entirely within the cylinder, said diaphragm being movable under the influence of the fluid to permit an initial supply of fluid to enter the cylinder to move the piston in one direction, means for limiting such movement of the diaphragm, and means for moving the piston in the opposite direction, the last said movement of the piston operating to cause the diaphragm to close the said opening, said diaphragm under predetermined conditions yielding under fluid pressure through said opening to admit fluid to the cylinder, to augment the movement of the piston in the first said directon through the medium of the said fluid already in the cylinder, the first recited said supply of fluid through said opening being maintained out of commingling relation with the fluid already in the cylinder.

14. Braking mechanism embodying a cylinder having an opening providing an inlet for the fluid, a piston in the cylinder, a flexible floating element positioned to control said opening and movable under the influence of fluid pressure to permit the passage of fluid into the cylinder beyond the element to move said piston in one direction, means for limiting such movement of the said element, and means for moving the piston in the opposite direction, the last said movement of the piston operating to cause the said element to engage an abutment to close said opening against the outlet of fluid from the cylinder, a portion of the said element being yieldable under predetermined conditions under the influence of fluid pressure through said opening, while the said element maintains the opening closed to the entrance of fluid into the cylinder beyond the said element, the last said movement of the said element serving to augment the movement of the piston through the medium of the pressure of the fluid which is trapped in the cylinder beyond the said element.

GEORGE F. CHARD.